(12) United States Patent
Riordan et al.

(10) Patent No.: US 7,516,490 B2
(45) Date of Patent: Apr. 7, 2009

(54) SYSTEM, METHOD AND SOFTWARE FOR SUPPLYING ACTIVATION INFORMATION TO A SUBSYSTEM

(75) Inventors: James F. Riordan, Adliswil (CH); Dominique Alessandri, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 09/821,584

(22) Filed: Mar. 29, 2001

(65) Prior Publication Data

US 2002/0112179 A1   Aug. 15, 2002

(30) Foreign Application Priority Data

Mar. 30, 2000   (EP)   .................. 00106812

(51) Int. Cl.
*H04L 9/00* (2006.01)
*G06F 12/14* (2006.01)
*G06F 9/44* (2006.01)
*G08B 23/00* (2006.01)

(52) U.S. Cl. ..................... 726/25; 713/173; 705/66; 717/171

(58) Field of Classification Search ............. 713/200, 713/173; 705/66; 717/171; 726/25
See application file for complete search history.

(56) References Cited

U.S. PATENT DOCUMENTS

| 5,825,877 | A | | 10/1998 | Dan et al. |
| 5,948,104 | A | * | 9/1999 | Gluck et al. ................. 726/24 |
| 5,958,053 | A | * | 9/1999 | Denker ........................ 726/1 |
| 5,978,484 | A | | 11/1999 | Apperson et al. |
| 6,052,531 | A | * | 4/2000 | Waldin et al. ............... 717/170 |
| 6,094,679 | A | * | 7/2000 | Teng et al. .................. 709/220 |

(Continued)

FOREIGN PATENT DOCUMENTS

EP   0077950 A1   6/1985

(Continued)

OTHER PUBLICATIONS

Wollrath et al, "Simple Activation for Distributed Objects", Nov. 1995, Sun Microsystems Laboratories, Inc. pp. 1-18.*

(Continued)

*Primary Examiner*—Emmanuel L Moise
*Assistant Examiner*—Michael Pyzocha
(74) *Attorney, Agent, or Firm*—Ido Tuchman; Lisa M. Tamonaco

(57) ABSTRACT

The invention provides a form of reacting on security or vulnerability information relevant for a system comprising computer software and/or hardware or electronics, wherein a service provider with a first subsystem (1) is providing activation tokens to be received by a customer with a second subsystem (2). The activation tokens including activation information and naming of system characteristics in machine readable and filterable manner. The second subsystem (2) comprises receiving means (11) for controlling the receiving of the activation tokens, checking means (12) for automatically determining whether the activation information is relevant for the second subsystem (2) by checking whether the second subsystem has characteristics corresponding to the naming of an activation token, and transforming means (13) for transforming relevant activation information into at least one activation measure for the second subsystem (2). The activation measures will reduce the vulnerability of the second subsystem.

18 Claims, 1 Drawing Sheet

U.S. PATENT DOCUMENTS

| | | | |
|---|---|---|---|
| 6,178,504 B1 * | 1/2001 | Fieres et al. | 713/164 |
| 6,185,689 B1 * | 2/2001 | Todd et al. | 726/25 |
| 6,243,815 B1 * | 6/2001 | Antur et al. | 726/11 |
| 6,269,456 B1 * | 7/2001 | Hodges et al. | 714/38 |
| 6,484,315 B1 * | 11/2002 | Ziese | 717/173 |
| 6,557,105 B1 * | 4/2003 | Tardo et al. | 713/193 |
| 6,636,983 B1 * | 10/2003 | Levi | 714/4 |
| 6,651,249 B2 * | 11/2003 | Waldin et al. | 717/170 |
| 6,721,721 B1 * | 4/2004 | Bates et al. | 707/1 |
| 6,725,377 B1 * | 4/2004 | Kouznetsov | 726/23 |
| 6,834,350 B1 * | 12/2004 | Boroughs et al. | 726/3 |
| 6,907,531 B1 * | 6/2005 | Dodd et al. | 726/25 |
| 6,971,026 B1 * | 11/2005 | Fujiyama et al. | 726/25 |
| 6,990,591 B1 * | 1/2006 | Pearson | 726/22 |
| 7,013,330 B1 * | 3/2006 | Tarbotton et al. | 709/219 |
| 7,028,338 B1 * | 4/2006 | Norris et al. | 726/23 |

FOREIGN PATENT DOCUMENTS

| | | |
|---|---|---|
| EP | 1061432 A2 | 12/2000 |
| WO | WO 00/62232 A1 | 10/2000 |
| WO | WO 01/42889 A2 | 6/2001 |
| WO | WO 99/57863 A1 | 8/2001 |

OTHER PUBLICATIONS

"Norton AntiVirus for Windows 95/98 User's Guide," 1998, pp. 37-39.*

"Norton AntiVirus for Windows 95/98 User's Guide," 1998, pp. 1-62.*

Riordan, James et al., "Target Naming and Service Apoptosis," Lecture Notes in Computer Science, Oct. 27, 2000, pp. 217-225.*

Barnes & Noble.com printout for Recent Advances in Intrusion Detection: Third International Workshop, Raid 2000, Toulouse, France, Oct. 2-4, 2000, Proceedings, vol. 190. <http://search.barnesandnoble.com/booksearch/isbnInquiry.asp?z=y&EAN=9783540410850&itm=1>.*

Patterns of Network Intrusion—James Riordan; IBM Zurich research Laboratory, Saumerstrasse 4, CH-8803 Ruschlikon, Switzerland. Feb. 17, 2000.

Environmental Key Generation Towards Clueless Agents—James Riordan and Bruce Schneier; University of Minnesota, LNCs 1419, pp. 15-24, 1998.

Apoptosis—the Programmed Death of Distributed Services—Christian Tschudin, 1999.

EP 779570 A1—System And Method For Supporting Distributed Computing Mechanisms In A Local Area Network Server Environment, Jun. 18, 1997.

WIPO 9930228 A2—Method And Apparatus For Selective Execution Of A Computer Program, Jun. 17, 1999.

* cited by examiner

SYSTEM, METHOD AND SOFTWARE FOR SUPPLYING ACTIVATION INFORMATION TO A SUBSYSTEM

FIELD OF THE INVENTION

The present invention relates to the way of reaction on security or vulnerability information relevant for a system comprising computer software and/or hardware or electronics. The reaction consists in altering or shutting down the system or a service of the system.

BACKGROUND OF THE INVENTION

The amount of security relevant news and information published on a daily basis increases rapidly. It is no more a background task for a system administrator to read this information and act in response to it. Even security services and compacted security news sources have the disadvantages of offering too much information causing a large time delay between time received and time read. Therefore the time between public knowledge and acting in respect of said security relevant information is increasing. This is also due to the fact, that the security or vulnerability information is published at different time zones during daytime, at night and over weekends. The growing window of vulnerability increases the chance of attack. The attacking by system crackers is described by James Riordan in "Patterns of network intrusion", Günter Müller and Kai Rannenberg, editor, Multilateral Security in Communications, Information Security, pages 173-186, Addison-Wesley, 1999. System crackers build large databases of what versions and revisions of software various systems are running. With this knowledge crackers can immediately react on announcements of vulnerabilities with a wide scale of exploitation of this vulnerability. In order to prevent exploitation of vulnerability, the administrator has to shut down, restrict or replace at least one service of the system. An other possible reaction is installing patches or upgrades without the discovered security problem. Since the system administrator has difficulties to cope with the increasing amount of security information, taking or at least suggesting measures could be done by a security service provider. The service provider could provide several clients with information on relevant measures for their systems. Since the service provider would be contacting the vulnerable system from outside, there will be the need of cryptographic security. The service provider would have to know the exact characteristics of the clients systems. This external knowledge and the possibility to find out what groups of clients receive the same information about necessary measures, could supply system crackers with information about vulnerabilities of the clients systems.

A concept for secure shutting down of mobile services is described by Christian Tschudin "Apoptosis the Programmed Death of Distributed Services", in J. Vitek and C. Jensen, editors, Secure Internet Programming—Security Issues for Mobile and Distributed Objects, pages 253-260, Springer, 1999. Active networks with services run by mobile code have to have the functionality of creating and ending services. The apoptosis concept of self-destructing mobile services is borrowed from cell biology and designates there the programmed cell death. The apoptosis process is suggested to start as for cells by two different ways. A service may depend on a continuous stream of credentials or positive signals. Once these credentials run out, the service will shut down. According to the second way a negative signal causes the service to shut down. The apoptosis entry point of a mobile service would be a primary target for an attack. Therefore the apoptosis concept should be implemented with cryptographic security functions. Cryptographic security functions are described by J. Riordan and B. Schneier, Environmental Key Generation Towards Clueless Agents, in G. Vigna, editor, Mobile Agents and Security, volume 1419 of LNCS, pages 15-24, Springer, 1998. The shut down has to be induced by an apoptosis activator. Applying the above mentioned apoptosis concept does not change the disadvantage that a system administrator or a security service provider has to induce the shut down procedure.

U.S. Pat. No. 5,978,484 describes a method and system for distributing and executing executable code. This method is applied in a client-server environment in which executable objects are downloaded or otherwise distributed from a distributing authority and executed on a different computer. While it is very desirable for a client to execute server-provided software, the potential threat to security is a serious drawback. For a client to be willing to execute server-defined functionality, the client must be assured that no adverse effects will occur. Specifically, there must be a guarantee that existing client data will not be read or modified and that hostile code (viruses, Trojan horses, etc.) will not be generated and installed on the client system. Since server provided programs would have access to the full resources of the client computer environment, they could potentially perform any of various different types of dangerous or hostile operations. Binary executable code also has the disadvantage of being architecture specific. It is a significant complication for the server to determine the computer hardware in use by the client and the operating system, and to provide different executable modules for use with different systems. These issues lead naturally to consideration of an interpreted language. This approach allows a server to create program scripts that can be executed on the client to extend its functionality, while providing a more controlled execution environment and architecture neutrality. Interpreter systems, as for example Java, allow the generation of complex applications including I/O operations and rely on trust relationship between the server and the client. In order to eliminate the requirement of a trust relationship the invention of U.S. Pat. No. 5,978,484 classifies different types of security related operations and services, which might potentially be performed by externally provided code, into different categories. When providing executable code, a distributing authority also provides a privilege request code, indicating a set of privileges or privilege categories that the executable code might perform on the client machine. The distributing authority digitally signs the executable code and the privilege request code, and also provides a certificate that can be traced by the client to a known certifying authority. The certificate indicates an authorized set of privileges that the distributing authority has been authorized to include in distributed code.

If a solution according to U.S. Pat. No. 5,978,484 would be used to prevent exploitation of vulnerability, the distributing authority would have to transmit code and the privileges for shutting down, restricting or replacing insecure services at the client. Since the vulnerability depends on the actual characteristic, specification or version of the service, the distributing authority would need to know this information for any client service at any time accurately. The chance that a service or underlying code is updated at a client without reporting it to the distributing authority is rather high. Without accurate information about all services secured by the distributing authority, the distributing authority can not guarantee a security service. An other disadvantage of a security service supplied by a distributing authority is the fact that information about characteristics, specifications or versions of the services transferred from the services to the distributing authority and information about security measures transferred from the distributing authority to a service could be used by system crackers.

U.S. Pat. No. 5,825,877 describes an other solution for the delivery of software through distribution systems such as networks. This solution provides a form of authentication wherein a trusted third party signs a certificate to identify the author of a program and to secure its integrity. The program code is encapsulated or otherwise associated with the certificate and an access control list. The access control list describes the permissions and resources required by the code. An enforcement mechanism allocates system permissions and resources in accordance with the access control list. Upon downloading the code and the access control list with the corresponding certificate a verifier first checks to see if the certification agency's signature on the certificate is valid (using the certification agency's known public key). The verifier then computes the cryptographic hash of the code/access control list and verifies that it matches the value in the certificate. If the signature is not valid or the hash does not match, the code and the access control list are rejected. If the verification is ok, an access control list manager is invoked. The access control list manager displays the access control list to the client via a client interface and ascertains whether the client wishes to allow or disallow the individual items in the access control list. The access control list manager stores the code as directed by the client via the client interface and stores the access control list together with permission flags. The access control list consists of two parts: the physical resource table containing the physical resources required by the code and the logical resources table containing the permissions and logical resources required by the code. If such a solution would be used for shutting down, restricting or replacing insecure services at a client system, it would have the same shortcomings as described in respect of a solution according to U.S. Pat. No. 5,978,484.

SUMMARY OF THE INVENTION

In view of the foregoing, the invention provides a form of reacting on security or vulnerability information relevant for a system comprising computer software and/or hardware or electronics, wherein a service provider with a first subsystem is providing activation tokens to be received by a customer with a second subsystem. The activation tokens including activation information and naming of system characteristics in machine readable and filterable manner. The second subsystem comprises receiving means for controlling the receiving of activation tokens, checking means for automatically determining whether the activation information is relevant for the second subsystem by checking whether the second subsystem has characteristics corresponding to the naming of an activation token, and transforming means for transforming relevant activation information into at least one activation measure for the second subsystem. The activation measures will reduce the vulnerability of the second subsystem.

A system consisting of the mentioned first and second subsystem enables an automated apoptosis service for the second subsystem. Since the second subsystem is determining whether the activation information is relevant, there is no need for transferring information about the second subsystem or its services to the first subsystem. The first subsystem can provide any activation token to any second subsystem respectively all activation token to all clients. The service provider does not need to have accurate information about all services secured by it. Since the activation token comprises naming of system characteristics in machine readable form, the second subsystem can automatically check whether the second subsystem has characteristics corresponding to the naming of an activation token. Only activation tokens with a naming corresponding to actual characteristics of the second subsystem, respectively to at least one service or at least a part of the second subsystem, need to be considered by the second subsystem. The activation information of the tokens to be considered is relevant and will be transformed into at least one activation measure for the second subsystem.

Activation tokens including activation information and naming of system characteristics in machine readable manner enable the customer to obtain activation information without providing the information in which activation tokens he or she is actually interested. There is no information transferred about characteristics, specifications or versions of the clients, their second subsystems or their services. Since there is no need to send the same tokens exclusively to groups of clients with the same characteristics, system crackers can not even gain information about groups of clients with the same characteristics.

System crackers might try to send false activation tokens to clients of a service provider. In order to prevent clients, respectively their second subsystems, from accepting activation tokens from untrusted third parties, the origin of an activation token has to be controllable. Therefore the receiving means of second subsystems include cryptographic means for verifying the service provider as the provider of the activation token. In order to facilitate such a verification, well-known digital encryption and signing techniques can be applied. Cryptographic security functions are described by J. Riordan and B. Schneier, Environmental Key Generation Towards Clueless Agents, in G. Vigna, editor, Mobile Agents and Security, volume 1419 of LNCS, pages 15-24, Springer, 1998. Well-known Public key cryptographic techniques are described in Schneier, Bruce; Applied Cryptography Second Edition: Protocols, Algorithms, and Source Code in C; New York: John Wiley & Sons, 1996. The content of these two references is hereby incorporated by reference. A possible embodiment of a cryptographic means for verifying the service provider can make use of Rivest-Shamir-Adlemen public key algorithm for digital signatures, in conjunction with a secure hashing algorithm, although other public key signature schemes, such as DSS, ElGamal, Elliptic Curve, can alternatively be used.

In addition to verifying the provider of the activation token as being a trusted service provider it can be necessary to verify at the second subsystem whether the trusted service provider is legitimated to send activation tokens to the customer. This means that the second subsystem can keep a list of trusted service providers, from whom activation tokens will be accepted.

If a second subsystem has characteristics corresponding to the naming of an activation token, then the activation information of the activation token is transformed into at least one activation measure for the second subsystem. In order to supply the activation information in a machine readable form, the security service provider is structuring the activation information of the activation tokens in a defined manner. The activation information could be just a degree of vulnerability respectively a threat level. An example of a set of threat levels characterizes threat levels from 1 to 5. Level 1 characterizes a possible service degradation by a vulnerability that allows an adversary to decrease the performance of the system significantly. Level 2 characterizes a possible denial of a service by any kind of vulnerability that allows an adversary to tamper with the system so it becomes unavailable. Level 3 characterizes a possible information theft by any kind of vulnerability that allows an adversary to obtain supposedly secret information. Level 4 characterizes a possible information manipulation by any kind of vulnerability that allows an adversary to manipulate or inject data into a system. Level 5 characterizes a possible taking control of a system by any kind of vulnerability that allows an adversary to execute arbitrary code on a system and therefore to compromise a system.

For any possible degree of vulnerability, respectively for any threat level, there would be at least one preset activation measure. The most obvious action to be taken in case of a matching activation token is shutting down the respective service. However also other actions can be taken, wherein the actions should be appropriate to the actual level of threat. The service could be reconfigured, for example by disabling a certain functionality. A patch could be installed or the system administrator could be alarmed. An other possible action would include the execution of a set of commands. The transforming means could therefore include a list with at least one action for each degree of vulnerability respectively for any threat level. The activation information could also include at least one activation measure or a list of activation measures with a grading of their preference, respectively importance. The most appropriate action could also depend on other parameters of the second subsystem. For example the daytime or the weekday. This means that the same threat level could cause different action at different times. The preferred action could also depend on the actual operation of the second subsystem, on the sensitivity of the information hosted by the second subsystem the environment in which the system is operated or the degree to which the service provider is trusted. These parameters are filter parameters which enable transforming of at least one activation information into at least one acceptable activation measure. The lists of measures and filter parameters can be set by the system administrator in order to create a specific way his subsystem is reacting on relevant activation tokens. The administrator of the customer may even choose to ignore certain activation tokens.

In an embodiment which is giving control over measures taken to the administrator, the second subsystem is suggesting measures to be taken to the administrator. The administrator then selects measures he agrees with. This suggesting can be done by implementation means of the second subsystem. If there is no response from the system administrator or if the second subsystem is set in a automatic response mode, the implementation means implements predefined acceptable measures, most likely the shutting down or limiting of a service. Measures taken should be reported by reporting means. This reporting helps the administrator to understand changes in the mode of services or the second subsystem. Since the characteristics of the second subsystem or a service can be changed by the measures taken, it is important that the new characteristics will be stored. Therefore a new activation token will only be relevant, if the naming corresponds to the new characteristics. This means for example, if a new patch is installed due to a first activation token, a second activation token naming the new patch will be considered relevant for the system.

Experience has demonstrated that consistent naming is a problem in the field of security relevant news and information. For example, security announcements related to a daemon might refer to the daemon with one of the following names:

"wu-ftpd-2.6.0(1)", "wu ftpd-2.6.0(1)", "wu ftpd 2.6.0(1)",
"wu-ftpd 2.6.0(1)", "wu-ftpd-2.6.0.1",
"WASHINGTON UNIVERSITY FTP SERVER, RELEASE 2.6.0(1)"
"WASHINGTON UNIVERSITY ftpd 2.6.0(1)", . . . .

This multiplicity of names makes writing filters that pass on only relevant messages to a system administrator very difficult. It is moreover the case that many vulnerabilities are not properties of the services themselves but their configuration. In these cases one does not wish to disable the entire service but only relevant subservices. An other measure would be suggesting an acceptable configuration. The problem with naming is solved by the security service provider by using a consistent naming. This consistent naming can include the step of naming by specifying a version and/or a platform and/or a configuration in a defined format.

A security service provider will have customers spread over a wide area. Therefore the distribution of activation tokens will be done over existing communication networks. In the interest of privacy and anonymity, the customers should be able to obtain activation tokens without providing the information in which activation token he or she is actually interested in. On the other hand the provider has the goal to make sure that a released activation token will reach every customer subscribed with the provider. The distribution can make use of distribution channels like the world wide web (http, ftp, et cetera), a local net, any broadcast system, an oblivious transfer mechanism or by shipping a data carrier for example together with a patch or a new version. The customers could download recently published activation tokens. The provider could distribute activation tokens by a sole purpose protocol by establishing a connection to every of its customers and transferring activation tokens. The provider could also publish the activation tokens on a sole purpose mailing list. These messages could then be treated on the customers site in an automated fashion. A distribution using a service as http or ftp could transfer activation tokens by means of a specific URL or by uploading a specific file. A less favorable distribution would need a query by the customer. Even if this query is done on a regular basis, it introduces a possibly dangerous delay between the publication of an activation token and the customers reaction.

There are two different ways to implement the handling of activation tokens on the customer side. In a first approach the handling functionality is located in the second subsystem, for example in its server. This means for example that a server interprets arriving activation tokens by itself and transforms these to activation measures to be implemented. The second approach is the introduction of a security or apoptosis subsystem at the second subsystem. This apoptosis subsystem receives activation tokens and takes the appropriate actions as already described before. This apoptosis system can be realized by any combination of means such as a separate daemon, a kernel module, a modified inittab, a modified inetd, modified tcp-wrappers, a modified rpcbind, et cetera. These means would be used to implement the apoptosis service or could be modified to implement the apoptosis service. Before taking any action the receiver has to verify the providers signature and go through its characteristics, respectively its configuration, in order to decide whether this received activation token is relevant for the second subsystem or a service thereof.

The apoptosis service can be adjusted to the complexity of the customers second subsystem. If the second subsystem does not have higher levels than a webserver, then the apoptosis service will be realized as described above. If the second subsystem includes a resource manager or network management—like for example Tivoli or HP Openview—and different hosts, then the apoptosis service can be implemented at the network management and/or at least one host and/or at least one webserver. All the necessary characteristics respectively configuration information about all hosts and their services could be available to an apoptosis service at the network management or resource manager. In this case the steps of receiving activation tokens, automatically determining whether the activation information is relevant for the second subsystem and transforming relevant activation information into at least one activation measure for the second subsystem could be carried out by the apoptosis service at the network management or resource manager. In an other embodiment the apoptosis service at the network management or resource manager would perform the apoptosis service only partially by filtering out activation tokens which are considered to be irrelevant for the second subsystem, respectively its hosts. In this case further apoptosis services would be located at hosts and/or webservers of the hosts. Therefore the apoptosis system at the second subsystem could be located at one or several locations, respectively means. In an other embodiment the apoptosis service could also be located in a hardware device.

DETAILED DESCRIPTION OF THE PREFERRED EMBODIMENTS

Figure 1:
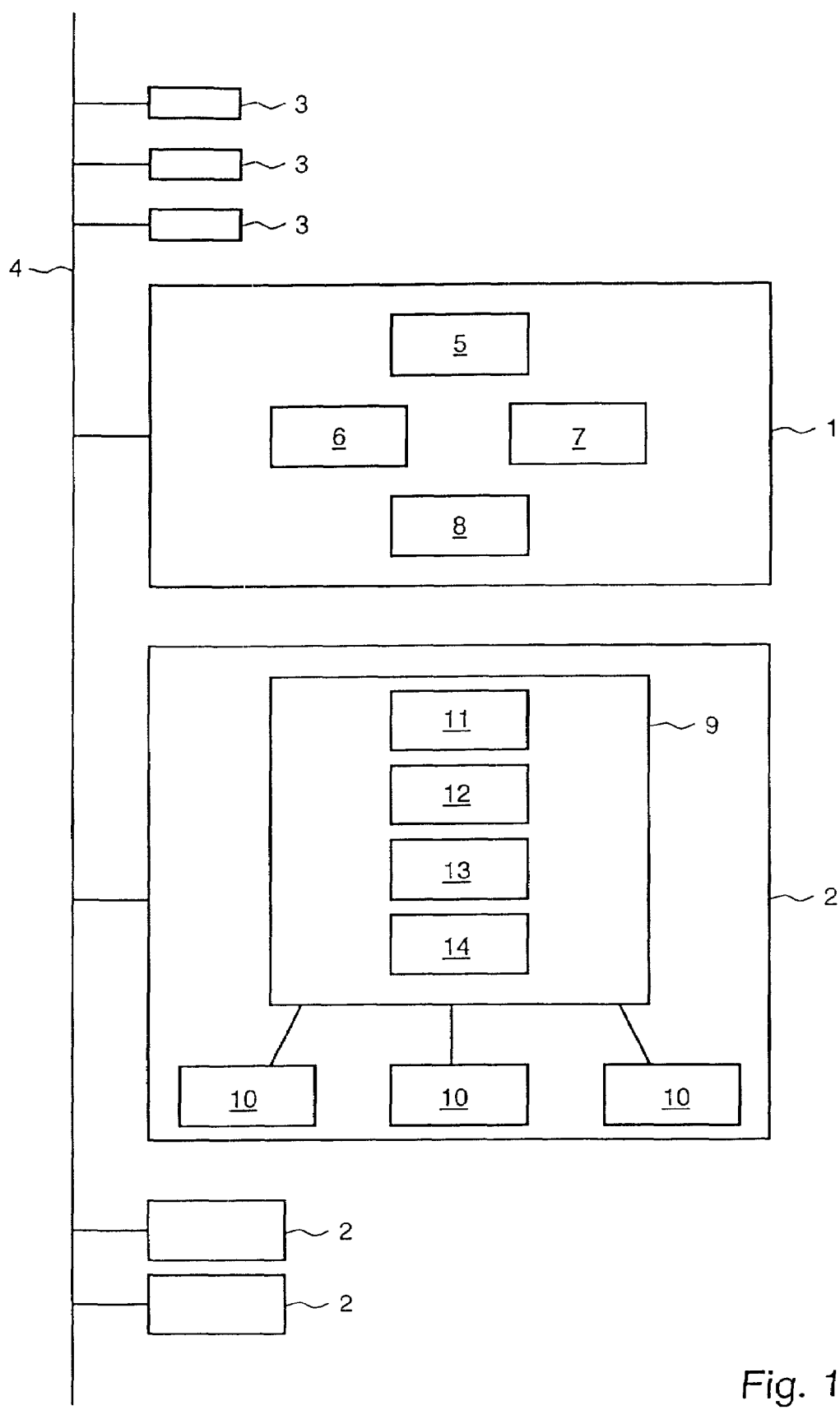
FIG. 1 is a block-diagram view of the system including a first and a second subsystem.

FIG. 1 shows a system with a first subsystem 1 and at least one second subsystem 2. The first subsystem 1 belongs to an apoptosis service provider and the second subsystems 2 belong to an apoptosis customers. The provider is an organization that selects a list of products for which it offers an apoptosis service to its customers. Each customer is a receiver of an apoptosis service offered by the apoptosis service provider. A customer aims to protect itself by signing an apoptosis contract with its apoptosis service provider. In consequence the customer is required to semitrust the provider as the customer may grant the provider the power to actively influence services run by the customer.

The apoptosis service provider will read all available security relevant news and information published by security or vulnerability information publishers 3. The security or vulnerability information transfer from the publishers 3 to the provider 1 is making use of a distribution cannel 4 like the world wide web (http, ftp, et cetera), a local net, any broadcast system, an oblivious transfer mechanism or by shipping data carriers for example together with patches or a new versions of software. The first subsystem 1 includes reviewing means 5 for reviewing security or vulnerability information. The reviewing means 5 enables selecting relevant vulnerability information. Therefore the reviewing means 5 enables at least displaying the available vulnerability information and selecting by an administrator of the provider relevant information. In order to facilitate the work done by the administrator, the reviewing means 5 could as well include filtering means for automatic filtering information in respect of specific systems. Relevant vulnerability information will be treated with naming means 6 for naming a system in a machine readable manner and activation means 7 for providing activation information in a machine readable manner. The naming and activation means 6, 7 can comprise an editor and preferably lists with predefined naming and/or activation information. The corresponding naming and activation information is building an activation token.

If the activation tokens can be supplied from the provider to the customer in a secure way, then the activation token can be used without any cryptographic security measure.

Normally the activation token will be transmitted by an insecure distribution cannel 4 like the world wide web (http, ftp, et cetera), a local net, any broadcast system, an oblivious transfer mechanism or shipping data carriers. Therefore the first subsystem 1 is preferably including cryptographic means 8 for encrypting the activation tokens. In order to enable a verification of the provider of an activation token, the cryptographic means 8 or an additional signing means is producing a verification information like a signature, to be verified by the customer for example with a public key. By transmitting encrypted and signed activation tokens, the apoptosis service is secured.

The embodiment according to the FIG. 1 shows a second subsystem 2 with an apoptosis system 9 and at least one service 10 run by the customer on the second subsystem 2. The apoptosis system 9 is preferably built into a daemon of the second subsystem 2 and comprises receiving means 11 for receiving activation tokens, checking means 12 for automatically checking whether the second subsystem 2, respectively a service 10 thereof, has characteristics corresponding to the naming of an activation token, transforming means 13 for transforming relevant activation information into at least one activation measure for the second subsystem 2 and implementation means 14 for implementing at least one activation measure at the second subsystem 2, respectively at a service 10.

The receiving means 11 preferably include cryptographic means for verifying the service provider as being the provider of the activation token for example by verifying a signature with a public key. In a preferred embodiment, the receiving means 11 further comprise admitting means for controlling whether the service provider is legitimated to send activation tokens to the customer. This controlling will include checking whether the provider is on a list of providers having a contract with the customer. From an acceptable activation token there will be the naming extracted and compared to a list with characteristics, respectively naming, of the second subsystem or services thereof. If this comparison shows a correspondence, then an extracted activation information of the activation token will be transmitted to the transforming means 13 and there it will be transformed into at least one activation measure. If the activation information is just a level of security threat, then the transforming can include reading a predefined measure corresponding to the level. The predefined measures can be defined by a system administrator at the second subsystem 2. The most appropriate action could also depend on other parameters of the second subsystem. For example the daytime or the weekday. This means that the same threat level could cause different action at different times. The preferred action could also depend on the actual operation of the second subsystem, on the sensitivity of the information hosted by the second subsystem the environment in which the system is operated or the degree to which the service provider is trusted. These parameters are filter parameters which enable transforming of the activation information into at least one acceptable activation measure.

In an embodiment which is giving control over measures taken to the administrator, the implementation means 14 is suggesting measures to be taken to the administrator. The administrator then selects measures he agrees with. If there is no response from the system administrator or if the implementation means 14 is set in an automatic response mode, the implementation means 14 implements predefined acceptable measures, most likely the shutting down or limiting of a service. Measures taken should be reported by reporting means preferably comprised by the implementation means 14. This reporting helps the administrator to understand changes in the mode of services 10 or the second subsystem 2. Since the characteristics of the second subsystem 2 or a service 10 can be changed by the measures taken, it is important that the new characteristics will be stored. Therefore a new activation token will only be relevant, if the naming corresponds to the new characteristics. This means for example, if a new patch is installed due to a first activation token, a second activation token naming the new patch will be considered relevant for the system.

A preferred embodiment with cryptographic security uses an apoptosis activation key (AAK) in the form of a secret random string (nonce). It should be long enough as to render brute force attack intractable. An apoptosis token (AT) consists of the image of a AAK under a cryptographic one way function H together with a complete description of a particular service or subservice instance. This description should include version, platform, and configuration information. The AT will generally be signed to bind the AAK. An apoptosis activation token (AAT) consists of the AAK together with an activation information. The most basic form of fullfunctioning apoptosis built into a daemon might look like:

```
// apoptosis token AT
at = read_my_AT_from_cfg_file( );
// verify AT signature
if (!verify_sign(at)) {
    send_warning("AT signature incorrect.");
    exit( );
}
// extract activation key hash from AT
akh = extract_ak_hash(at);
// endless loop
while (true) {
    // receive an AAT
    aat = receive_aat( );
    if (!verify_sign(aat)) {
        send_warning("AAT signature incorrect. Possible DoS attack.");
    }
    // extract the AAK
    aak = extract_aak(aat);
    if (hash(aak) == akh) {
        disable_daemon( );
        send_warning("Daemon received valid AAT. Daemon stopped.");
        exit( );
    }
    act_daemonically( );
}
```

As with many password schemes, the important feature is that complete knowledge of a code fragment and in particular of the AT does not give the ability to trigger the shutdown behavior. This is due to the one way nature of the one way hash function. One way hash functions, digital signatures, secret sharing and the constructions described in J. Riordan and B. Schneier, Environmental Key Generation Towards Clueless Agents, in G. Vigna, editor, Mobile Agents and Security, volume 1419 of LNCS, pages 15-24, Springer, 1998, allow configuring apoptosis services according to arbitrary trust models.

The above configuration places the apoptosis service in the daemon itself. Naturally the service could be implemented in a number of different ways, several of which do not require modification of the daemons themselves. A special apoptosis service could manage all other daemons on the second subsystem 2. This could naturally be combined with the meta-daemon inet. Alternately, tcp-wrappers (Ven), rpcbind or a sub-system management system could easily be modified to implement such functionality.

The second subsystem 2 can be any system which can have the above described functionality of the second subsystem 2. In the field of computer hardware and software it can be any system including network services, for example a webserver or a mailserver, and any application as for example a browser, databases, platforms, operating systems. In the field of hardware devices activation tokens respectively apoptosis services can be applied, if computer- or electronics-systems with the basic functionality of the second subsystem are comprised by, or added to, the hardware devices. For example a hardware device respectively an interface, which receives telecommunication signals or messages from satellites could handle activation tokens and in response to these activation tokens it could induce measures at an other hardware system. Such an apoptosis interface could for example interrupt the power supply or change the operation mode of the mentioned hardware system. The described apoptosis functionality could also be used in the context of recalling systems or parts of systems. If for example a car manufacturer would implement an apoptosis service, each car could be supplied with a second subsystem containing detailed information about the type of the car and about all relevant parts of the car. If for example, a specific air bag in a specific car could cause safety problems, an activation token with the naming of the car and the air bag could be transmitted to all cars of the manufacturer. The second subsystems in the cars would then find out whether the activation information of the activation token is relevant for this specific car. In cars where it is relevant, the second subsystem could display warning information and/or even disable triggering of the unsafe air bag. Transmitting activation tokens from the manufacturers first subsystem to the cars could be done by broadcast systems or at service places by connecting the second subsystem to a transmitting means. An additional advantage of the inventive system is the wide range of application where an automated checking whether information is relevant for a second subsystem can be done at the second subsystem.

The present invention, respectively the first and second subsystem, can be realized in hardware, software, or a combination of hardware and software. Any kind of computer system, respectively systems,—or other apparatus adapted for carrying out the methods described herein—is suited. A typical combination of hardware and software could be a general computer system with a computer program that, when being loaded and executed, controls the computer system such that it carries out the methods described herein. The present invention can also be embedded in computer program products, which comprise all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

The invention claimed is:

1. A security system comprising:
an activation token identifying system characteristics and specifying a threat level and at least one preset activation measure, wherein a system characteristic is one of the group of a hardware system, a service, a configuration of a service, a service execution platform, and a service version;
a first system comprising a processor, the first system configured to at least review security and vulnerability information from information publishers and to provide the activation token based on the security and vulnerability information; and
a second system configured to receive the activation token from a source external to the second system, the second system further configured to determine whether the activation token is relevant by checking if actual characteristics at the second system correspond to the system characteristics identified by the activation token, the second system further configured to transform the activation token into at least one activation measure if the activation token is considered relevant by the second system, the activation measure configured to modify services executing at the second system.

2. The system of claim 1, further comprising a cryptographic means configured to verify at the second system that the first system is a trusted service.

3. The system of claim 1, further comprising a reporting means configured to report to a system administrator of the second system activation measures taken by the second system.

4. The system of claim 1, wherein the first system is further configured to automatically filter the security and vulnerability information relevant to the system characteristics identified by the activation token.

5. The system of claim 1, further comprising a list of a plurality of trusted service providers from whom activation tokens are accepted by the second system.

6. The system of claim 1, wherein the at least one preset activation measure is shutting down a service affected by the specified threat level.

7. The system of claim 1, wherein the at least one preset activation measure is reconfiguring the functionality of a service affected by the specified threat level.

8. The system of claim 1, wherein the at least one preset activation measure is installing a patch for a service affected by the specified threat level.

9. The system of claim 1, wherein the at least one preset activation measure is alerting a system administrator.

10. A security system comprising:
an activation token identifying system characteristics and specifying a threat level and at least one preset activation measure, wherein a system characteristic is one of the group of a hardware system, a service, a configuration of a service, a service execution platform, and a service version;
a first system comprising a processor, the first system configured to at least review security and vulnerability information from information publishers and to provide the activation token based on the security and vulnerability information, wherein the information publishers are external to the first system; and
a second system configured to determine whether the activation token is relevant by checking if actual characteristics at the second system correspond to the system characteristics identified by the activation token, the second system further configured to transform the activation token into at least one activation measure if the activation token is considered relevant by the second system, the activation measure configured to modify services executing at the second system.

11. The system of claim 10, further comprising a cryptographic means configured to verify at the second system that the first system is a trusted service.

12. The system of claim 10, further comprising a reporting means configured to report to a system administrator of the second system activation measures taken by the second system.

13. The system of claim 10, wherein the first system is further configured to automatically filter the security and vulnerability information relevant to the system characteristics identified by the activation token.

14. The system of claim 10, further comprising a list of a plurality of trusted service providers from whom activation tokens are accepted by the second system.

15. The system of claim 10, wherein the at least one preset activation measure is shutting down a service affected by the specified threat level.

16. The system of claim 10, wherein the at least one preset activation measure is reconfiguring the functionality of a service affected by the specified threat level.

17. The system of claim 10, wherein the at least one preset activation measure is installing a patch for a service affected by the specified threat level.

18. The system of claim 10, wherein the at least one preset activation measure is alerting a system administrator.

* * * * *